United States Patent [19]

Craun et al.

[11] Patent Number: 4,897,450

[45] Date of Patent: Jan. 30, 1990

[54] TRANSESTERIFICATION CURE OF THERMOSETTING COATINGS

[75] Inventors: Gary P. Craun, Berea; Susan M. Sobek, Brunswick; Wellington F. Berghoff, Beachwood, all of Ohio

[73] Assignee: The Glidden Company, Cleveland, Ohio

[21] Appl. No.: 242,544

[22] Filed: Sep. 12, 1988

[51] Int. Cl.$^4$ .............................................. C08L 33/14
[52] U.S. Cl. .................................... 525/176; 525/111; 525/166
[58] Field of Search ........................ 525/111, 166, 176

[56] References Cited

U.S. PATENT DOCUMENTS 4,423,169 12/1983 Valko ................................... 525/176
4,489,182 12/1984 Valko ................................... 525/176
4,749,728 6/1988 Craun ................................... 523/400

Primary Examiner—Patricia Short
Attorney, Agent, or Firm—Thomas M. Schmitz

[57] ABSTRACT

A thermosetting paint coating composition is based on a thermosetting polymeric binder comprising a hydroxyl functional polyester polymer and a beta-hydroxy ester acrylic copolymer, where the polymer and copolymer are adapted to crosslink by transesterification in the presence of certain transesterification catalysts.

7 Claims, No Drawings

TRANSESTERIFICATION CURE OF THERMOSETTING COATINGS

This invention pertains to thermosetting paint coatings and particularly coatings based on a transesterification cure mechanism activated by certain transesterification catalysts to activate a beta-hydroxy ester addition copolymer of copolymerized monomers to crosslink with a hydroxyl functional polymer to produce an improved paint film.

BACKGROUND OF THE INVENTION

Transesterification of a simple ester compound with a simple alcohol compound is known to occur under basic conditions. The transesterification reaction is an equilibrium reaction which can be driven to completion by removing the alcohol moiety evolving from the cleaved ester. If the cleaved alcohol moiety is a low molecular weight lower alkyl alcohol such as methanol or ethanol, removal by evaporation is quite easy. It has been found that transesterification as a curing mechanism for crosslinking polymers used in paint coatings provides an attractive cure mechanism for producing thermosetting protective coatings since cleaved lower alkyl alcohols can be easily removed from the coating by simple air dry evaporation thereby driving the transesterification reaction to completion.

Related applications are as follows:

Commonly assigned Ser. No. 871,444 filed June 6, 1986, now being U.S. 4,749,728 discloses hydroxyl functional polymers adapted to cure by transesterification with a carboxylic ester functional polymer in the presence of transesterification catalysts. The transesterification catalysts comprise an onium salt or a Lewis base in combination with a catalytic amount of epoxy compound.

Commonly assigned Ser. No. 138,149 filed Dec. 28, 1987 pertains to similar polymers adapted to cure by transesterification in the presence of transesterification catalysts comprising a conjugate base of a weak acid having pka between 2.5 and 14 in combination with a catalytic amount of epoxy compound.

Commonly assigned Serial No. 157,249 filed Feb. 18, 1988 pertains to similar polymers adapted to be cured by transesterification in the presence of transesterification catalysts comprising an inorganic salt selected from halogens, azides,cyananides, and hydroxides in combination with a catalytic amount of epoxy compound.

Commonly assigned Ser. No. 251,762 filed concurrently Oct. 3, 1988 (Doc. 10328) pertains to similar coatings adapted to crosslink by transesterification based on polyester polymer containing a beta-hydroxy ester group activated by certain transesterification catalysts to crosslink with hydroxyl groups on polymers.

Commonly assigned Ser. No. 242,817 filed concurrently on Sept. 12, 1988 (Doc. 10332) pertains to similar coatings adapted to crosslink by transesterification based on a self-curing acrylic polymer containing beta-hydroxy ester groups adapted to coreact upon being activated by certain transesterification catalysts.

It now has been found that thermosetting paint coatings can be further improved based on thermosetting polymers comprising a hydroxyl functional polyester polymer adapted to be crosslinked with a beta-hydroxy ester acrylic copolymer by a transesterification cure in the presence of certain catalyst combinations. In accordance with this invention, beta-hydroxy ester acrylic copolymer crosslinkers are utilized instead of simple methyl ester polymers to produce considerably improved cured film integrity properties of paint films.

With respect to prior art, several patents disclose the use of acids, bases, metal salts, and organic metal complexes as catalysts for transesterifying polymers such as U.S. 4,362,847; U.S. 4,376,848; U.S. 4,332,711; and U.S. 4,459,393 wherein octoates or naphthenates of lead, zinc, calcium, barium, and iron are disclosed as transesterification catalysts.

Green U.S. 4,559,180 discloses an organic syntheses process for simple transesterification of very low molecular weight simple carboxyl ester compounds with similar simpler alcohols by reacting the same in the presence of an epoxide and a Lewis base (containing a Group V element) or a cyclic amidine. The Green patent does not pertain to coatings or polymers but merely discloses simple chemical reactions between very low molecular weight chemical compounds.

Dante and Parry have shown that phosphonium halides, such as ethyltriphenyl phosphonium iodide, are efficient catalysts for (a) 1,2-epoxide reactions with phenols to yield hydroxyl ethers (U.S. 3,477,990), and (b) polyepoxide reactions with carboxylic acids or acid anhydrides (U.S. 3,547,885). The patents suggest that polyepoxides and phenols can be reacted to form phenolic hydroxyl ethers with phosphonium salts as catalysts. The counterion of the phosphonium moiety is the anion portion of a carboxylic acid, or acid ester, such as in ethyltriphenyl phosphonium acetate (U.S. 3,948,855).

Barnhoorn et al (U.S. 4,459,393) teach self-crosslinking thermosetting resin compositions obtained from the reaction of a beta-hydroxyalkyl ester of an alpha,beta-carboxylic acid with a primary mono- or polyamine to give a product having 1 to 2 amino hydrogens and further reacted with a polyglycidyl ether of a polyhydric phenol so that the final resin adduct has more than one beta-hydroxyalkyl ester group and amine groups having 1 to 2 amine hydrogen atoms per molecule. Transesterification catalysts known in the art are taught.

Subramanyam et al (U.S. 4,376,848) teach the preparation of water dilutable electrocoating compositions having tertiary amino-containing basic binders by reacting a secondary amino group compound with an olefinically double-bonded epoxy and the copolymerization of this product with at least one ethylenically bonded polymerizable monomer wherein said binders can self-cure and be cured in combination with amine resins and/or phenolic resins. Common transesterification catalysts are taught.

Velko patents disclose resinous compositions curable through a transesterification curing mechanism based on conventional heavy metal catalysts. For instance, U.S. 4,423,167 discloses a polymeric polyol adapted to be crosslinked with a polyester having at least two beta-alkoxyester groups in the presence of conventional transesterification catalysts. Similarly, U.S. 4,489,182 is based on a crosslinking agent having at least two delta-hydroxy ester groups, while U.S. 4,423,169 is based on a crosslinking agent having at least two beta- and/or gamma-ester groups, and U.S. 4,423,168 is based on a crosslinking agent having at least two beta-amide ester groups. The Valko patents utilize as catalysts organic salts of conventional heavy metal catalysts such as lead, zinc, iron, tin and manganese.

In accordance with this invention, highly desirable thermosetting paint coatings are based on a polymeric binder comprising a hydroxyl functional polymer, preferably a polyester polymer, adapted to be crosslinked by transesterification with a beta-hydroxy ester addition copolymer, preferably an acrylic copolymer, upon being activated with a catalyst comprising certain nucleophiles in combination with a catalytic amount of epoxy compound. The novel transesterification cure using beta-hydroxy esters instead of simple methylesters as the crosslinking component provides a significant improvement in film properties. The beta-hydroxy crosslinking system of this invention is particularly useful in powder coatings, high solids liquid coatings, appliance coatings and thermosetting coatings generally. A particularly good balance of hardness and flexibility properties in film integrity characteristics can be achieved which is particularly important in a variety of industrial coating applications. Films with exceptional hardness and impact resistance can be prepared, for example, by blending as little as 5% hydroxyl functional polyesters into acrylics. Cure of the acrylic without the added polyester gave films with good hardness, but less than satisfactory flexibility. Epoxy nucleophile catalyzed transesterification in combination with the polyester polymer and acrylic copolymer provide unique combination of properties.

Acrylic films have desirable properties, such as weatherability, moisture resistance, detergent resistance, etc., but generally do not provide good impact resistance. Polyester films can have good impact resistance with good hardness, but they lack many of the good properties of acrylics. When blended and cured by conventional crosslinking chemistry, polyesters and acrylics can produce films which compromise quality. At a 50/50 ratio of polymers with melamine crosslinking, a polyester/acrylic blend will have fair impact resistance of 50 to 100 inch pounds at H to 2H hardness, but impact decreases rapidly as the proportion of acrylic increases, and other desirable properties, such as weathering, fall off rapidly as the proportion of polyester is increased.

Contrary to the foregoing accepted rule of compromise, it now has been found that acrylics can be cured by transesterification in accordance with this invention with a very small level of a variety of preferred polyesters at levels as low as about 5%. Resulting films will have hardnesses to 4H with impact resistances of 160 inch pounds of impact, forward and reverse. This discovery provides a means of formulating industrial paints with a unique mix of properties, including water, detergent, and weathering resistance, while maintaining hardness and impact resistance.

These and other advantages of this invention will become more apparent by referring to the detailed description and illustrative examples.

SUMMARY OF THE INVENTION

Briefly, the invention pertains to thermosetting protective paint coatings based on a polymeric binder combination of a hydroxyl functional polymer adapted to be crosslinked with a beta hydroxy ester addition copolymer of copolymerized monomers where coreaction is activated by a transesterification catalyst combination of certain nucleophiles and a catalytic amount of epoxy compound. The thermosetting polymeric binder combination comprises by weight between about 2% and 50% hydroxyl functional polymer and between 50% and 98% beta-hydroxy ester copolymer. The catalyst combination comprises between 1 and 20 weight parts of catalytic epoxy compound combined with 0.1 to 10 weight parts of certain nucleophiles per 100 weight parts of matrix binder.

DETAILED DESCRIPTION OF THE INVENTION

Beta-hydroxy ester addition copolymers are utilized in accordance with this invention to crosslink with hydroxy functional polymers upon activation with transesterification catalysts comprising certain nucleophiles combined with a catalytic amount of an epoxy compound.

Referring to the self-curing addition copolymer, hydroxyl and ester groups in the form of a beta-hydroxy ester group are introduced into the copolymer by copolymerizing ethylenically unsaturated monomers including a beta-hydroxy ester monomer along with other ethylenic monomers where the inclusion of acrylic monomer is preferred and a beta hydroxy ester acrylic copolymer is preferred. Referring first to the beta-hydroxy ester monomer components, a beta hydroxy ester monomer is an ethylenically unsaturated monomer generally containing the theoretical beta-hydroxy ester chemical structure as follows:

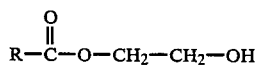

where the hydroxyl group is attached to the second (beta) carbon atom relative to the ester group and R is an alkyl chain containing terminal ethylenic carbon-to-carbon unsaturation. Any one of the hydrogens on the alpha or beta carbons can be substituted with a methyl group or similar short chain alkyl group. It is hypothesized that the ester group can form a loose six-membered, hydrogen bonding ring with the beta-hydroxyl group, which is known to weaken the beta-ester group and provide a weak ester bond to facilitate cleavage of the ester group by transesterification in accordance with this invention. Other beta-hydroxy ester groups in the same polymeric structure can function as a hydroxyl component which transesterifies with the weakened beta-ester group to form a transesterification crosslink between the beta ester and the beta hydroxyl groups of different beta-hydroxyl ester groups on the same acrylic polymer. Suitable beta hydroxy monomers can be produced by reacting an acrylic or methacrylic acid with ethylene oxide or propylene oxide to produce the beta-hydroxy ester structure in conjunction with an ethylenically unsaturated double bond. Beta-hydroxylate ester monomers include hydroxyl alkyl acrylates such as 2-hydroxy ethyl acrylate and methacrylate, 2-hydroxypropyl acrylate and methacrylate, and similar hydroxyl alkyl acrylates.

Beta-hydroxyl ester addition polymers, and particularly acrylic copolymers, provide both the ester function and hydroxyl function for the transesterification cure. Acrylic copolymers are produced by copolymerizing of ethylenically unsaturated monomers, including a beta-hydroxy monomer, where peroxide or azo catalysts initiate copolymerization of the monomer double bonds. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate. Other ethylenically unsaturated monomers containing carbon-to-carbon unsaturation include vinyl monomers, allylic monomers and acrylamide monomers. Vinyl esters include vinyl acetate, vinyl propionate, vinyl butyrates, vinyl benzoates, vinyl isopropyl acetates, and similar vinyl esters. Vinyl halides include vinyl chloride, vinyl fluoride, and vinylidene chloride. Vinyl aromatic hydrocarbons include styrene, methyl styrenes and similar lower alkyl styrenes, chlorostyrene, vinyl toluene, vinyl naphthalene, divinyl benzoate, and cyclohexene. Vinyl aliphatic hydrocarbon monomers include alpha olefins such as ethylene, propylene, isobutylene, and cyclohexyl as well as conjugated dienes such as butadiene, methyl-2-butadiene, 1,3-piperylene, 2,3 dimethyl butadiene, isoprene, cyclopentadiene, and dicyclopentadiene. Vinyl alkyl ethers include methyl vinyl ether, isopropyl vinyl ether, n-butyl vinyl ether, and isobutyl vinyl ether. High levels of carboxyl functional monomers should be avoided.

On a weight basis, the beta-hydroxy addition copolymer consists of copolymerized ethylenic monomers comprising between 1% and 50% beta-hydroxyl ester monomer with the balance being other ethylenically unsaturated monomer. Preferred beta-hydroxy copolymers are acrylic copolymers containing between 1% and 99% acrylic monomer with preferred beta-hydroxy ester acrylic copolymers comprising between 10% and 30% beta-hydroxy ester monomer, between 70% and 90% acrylic monomer, with the balance being other ethylenic monomer.

Referring now to the hydroxyl functional polymer adapted to be crosslinked by transesterification with the beta-hydroxy ester copolymer, the hydroxyl functional polymer comprises low molecular weight polymers and can include hydroxyl functional polyester epoxy resins, polyamides, polyurethanes, diols and similar polyhydroxy functional oligomers and polymers.

Preferred hydroxyl functional polymers adapted to be crosslinked by beta-hydroxy ester acrylic copolymers in accordance with this invention are hydroxyl functional polyesters comprising linear or branched condensation polymers produced by coreacting excess equivalents of diol with less equivalents of dicarboxylic acid. Suitable diols include conventional glycols such as ethylene, propylene, the butylene glycols, n-pentyl glycol, hexols, as well as ether glycols such as diethylene and dipropylene glycol. Preferred diols are higher aliphatic diols containing between 4 and 14 carbon atoms. Examples of suitable higher aliphatic diols include neopentyl glycol, 1,6-hexane diol, hydrogenated bisphenol A, cyclohexane dimethanol and the like. Minor amounts of triols and tetraols can be included to provide branching. Examples include trimethyol propane, trimethylol ethane, pentaerithritol and the like.

The dicarboxylic acid component should comprise a dicarboxylic acid containing at least three carbon atoms and can include, for example, lower alkyl dicarboxylic acid such as malonic (propanedioic) acid, succinic acid, glutaric acid, adipic acid, pimelic acid, suberic acid, sebacic acid, as well as higher aliphatic dicarboxylic acids containing between 11 and 22 carbon atoms such as undecanedioic and dodecanedioic acids as well as tri-, tetra-, penta-, hexa-, hepta, octa-decanedioic acids and similar higher aliphatic dicarboxylic acids. Useful dicarboxylic acids can further include aromatic diacids or anhydrides such as phthalic acid or anhydride, isophthalic acid, terephthalic acid, tetrahydrophthalic acid or anhydride, and similar aromatic dicarboxylic acids. Useful carboxylic acids can further include, if desired, trifuntional acids such as trimellitic anhydrides. Hydroxyl functional polyester polymer ordinarily comprise a 1% to 200% excess equivalent diol coreacted with lesser equivalent dicarboxylic acid to provide a polyester polymer having a hydroxyl number between 5 and 200. The number average molecular weight as measured by GPC can be between 300 and 30,000 and preferably between 400 and 5,000. GPC is measured by ASTM D3016-78, D3536-76 and D3593-80.

Other hydroxyl functional polymers can include epoxy resins. Useful epoxy resins are predominantly linear polymeric reaction products of dihydroxy phenols or bisphenols with halohydrins. Preferred reactants are bisphenol-A and epichlorohydrin, where excess molar equivalents of epichlorohydrin are reacted with bisphenol-A to produce predominantly diepoxide chains. Although epoxy resins contain reactive hydroxyl groups on the epoxy backbone, hydroxyl groups can be generated by reacting the epoxide groups with a carboxyl reactant, benzoic acid for instance, to generate a pendant hydroxy group.

Hydroxyl functional polyurethane polymers can be transesterified with ester functional polymers in accordance with this invention. Hydroxyl functional polymers typically contain urethane groups in the polymer backbone and are produced by reacting excess equivalents of diol or polyol with lesser equivalents of di- or polyisocyanate. The polyisocyanates can be di- or triisocyanates such as for example, 2,4 and 2,6 tolylene diisocyanate, phenylene diisocyanate; hexamethylene or tetramethylene diisocyanate, 1,5 naphthalene diisocyanate, ethylene or propylene diisocyanate, trimethylene or triphenyl or tirphenysulfone triisocyanate, and similar di- or triisocyanates. The polyisocyanate can be generally selected from the group of aliphatic, cycloaliphatic and aromatic polyisocyanates such as for example, hexamethylene 1,6-diisocyanate, isophorone diisocyanate, diisocyanate, 1,4-dimethyl cyclohexane, diphenylmethane diisocyanate 2,4-tolylene diisocyanate, 2,6-tolylene diisocyanate and mixtures thereof, polymethylene polyphenyl polyisocyanate. Useful polyols preferably contain two or more hydroxyl groups for co-reaction with the isocyanate groups. Useful polyols are: -diols such as ethylene glycol, propylene glycols, butylene glycols, neopentyl glycol, 1,4-cyclohexane dimethanol, hydrogenated bisphenol A, glycerol, trimethylol propane, trimethylol ethane pentaerythritol sorbitol, dipentaerythritol, ester polyols, and similar polyols.

The thermosetting polymeric binder comprises on a weight basis between 2% and 50% hydroxyl functional polymer, preferably polyester polymer, with 50% to 98% of a beta-hydroxy ester copolymer. Preferred compositions comprise between 5% and 30% hydroxyl functional polymer where the most preferred compositions comprise between 5% and 30% hydroxyl functional polyester polymer with 70% to 95% beta-hydroxy ester acrylic copolymer.

Referring next to the transesterification catalyst systems useful in accordance with ths invention, the transesterification catalyst comprises certain nucleophilic compound in combination with a catalytic amount of epoxy compound.

The nucleophilic compound cocatalyst can be selected from (a) an onium salt or a Lewis base as described in commonly assigned Serial No. 871,444 filed June 6, 1986 now U.S. 4,749,728; (b) a conjugate base of a weak acid having a pka between about 2.5 and 14 as described in commonly assigned Serial No. 138,149 filed Dec. 28, 1987, or (c) an inorganic salt of a halide, an azide, a cyanide or hyroxide as described in commonly assigned Ser. No. 157,249 filed Feb. 18, 1988, and the same are all incorporated herein by reference.

Onium salts and Lewis bases are non-acidic nucleophilic compounds substantially free of an active hydrogen. Onium salts are tetravalent compounds preferably comprising tetravalent phosphorus or phosphonium salts and tetravalent nitrogen or ammonium salts. The onium salts can be aliphatic or aromatic and various anions can be associated with the onium ions. Phosphonium salts include, tetrabutyl phosphonium acetate, tetrabutyl phosphonium chloride, ethyltriphenyl phosphonium iodide, ethyltriphenyl phosphonium acetate, and the like. Ammonium salts include benzyltrimethyl ammonium chloride, benzyltrimethyl ammonium acetate, benzyltrimethyl ammonium benzoate, tetrabutyl ammonium chloride, and the like. Fatty quats such as mono and dialkyl ammonium compounds having one or two aliphatic R groups of 8 to 16 carbons are also suitable. Examples include hexadecyltrimethyl ammonium iodide, tallow and cocoa di- and trimethyl ammonium quats, and the like. It has been found that alkyltrimethyl quats like dodecyl trimethyl ammonium acetate are more thermally stable than benzyl quats like benzyl trimethyl ammonium acetate. Hence, a maximum curing temperature of about 325° F. can be obtained with the benzyl quats, but the alkyl quats can be used up to 400° F. or more. This latitude in cure temperature is desirable for thicker paint films and more thorough cure at shorter bake schedules.

Onium salts further include quaternary ammonium compounds such as tetraethyl ammonium chloride, tetrapropyl ammonium acetate, and hexyl trimethyl ammonium bromide; quaternary phosphonium compounds; onium halides and pseudo halides; onium carboxylates; and an N-alkylated pyridinium salt such as hexadecyl pyridinium bromide, chloride and acetate. Other onium catalyst components include tetrabutyl phosphonium bromide and chloride, tetraphenyl phosphonium iodide, and ethyl triphenyl phosphonium acetate, and can further include sulfonium salts. Useful sulfonium compounds can include, for example, tributyl sulfonium chloride, dibutyl phenyl sulfonium acetate, S-butyl 1,4-butyl sulfonium benzoate and the like.

Lewis bases are trivalent organic compounds containing an element selected from nitrogen, phosphorous, arsenic, antimony, or bismuth where the most useful and preferred are trivalent nitrogen or trivalent phosphorus compounds. Trivalent nitrogen compounds comprise aliphatic or aromatic amines. Tertiary amines are preferred and include, for example, dimethylbenzyl amine, diethyldecyl amine, tributyl amine, triethyl amine, trimethyl amine, triethylene diamine (DABCO), N-methyl morpholine, N,N'-dimethyl piperazine, N,N,N'N'-tetramethyl propane diamine, benzyldimethyl amine, dodecyldimethyl amine, and the like. A preferred tertiary amine is triethylene diamine. Primary and secondary amines are less desired due to active hydrogens but nevertheless can be converted to tertiary amines with excess epoxy cocatalyst prior to the esterification reaction. Amine functional polymers contain a tertiary amine group. Polymeric amine species of this type are not volatile, and hence, promote better cure. Amine functional acrylic monomers such as dimethylaminoethyl methacrylate, can be copolymerized with various monomers to form amine functional acrylic resins. Heterocyclic compounds containing trivalent nitrogens, such as pyridines, amidines, guanidine, and the like are useful. Tertiary phosphorus compounds are analogous to amines mentioned above. Examples of suitable compounds include: triphenyl phosphine, tricyclohexyl phosphine, tributyl phosphine, phenyldimethyl phosphine, diethyl benzyl phosphine and the like.

Referring next to the conjugate bases of a weak acid used in conjunction with catalytic epoxy resin to form the transesterification catalyst in accordance with this invention, suitable conjugate bases comprise various salts of the weak acids and such salts include sodium, potassium, calcium, lithium, and similar other metal salts. Suitable weak acids include weak organic and inorganic acids having a pka between 2.5 and 14 and preferably between 2.5 and 10, where pka is a measure of the strength of these weak acids which are often referred to as Bronsted acids. In contrast, strong acids such as hydrochloric, nitric, and sulfuric acids, and similar strong acids, have a pka less than 2.5 whereby the conjugated bases of these stronger acids do not provide suitable cocatalysts in accordance with this invention. In this regard, the strong acids dissociate easily in water to generate base anions and hydrogen ions (H+) and hence are unsuitable as cocatalysts.

Conjugate bases of weak acids, such as acetic acid, benzoic acid, and boric acid, comprise the acetate, benzoate, and borate ions. Conjugate bases of weak acids can be prepared by neutralizing the acids, such as benzoic acids, with a strong mineral base, such as KOH, to form the salt, potassium benzoate. Conjugate bases of weak organic acids include sodium benzoate, potassium acetate, potassium laurate, and sodium and potassium salts of polymeric materials. Examples of carboxylic polymeric materials include acrylics which contain salts of methacrylic acid, acrylic acid, maleic anhydride and the like (salts of these acid can be prepared with bases like KOH or NaOH before or after polymerization), and polyesters which have unreacted carboxylic acid, such as polyesters prepared from isophthalic acid, adipic acid, azeleic acid, and the like with the common diols and polyols. Conjugate bases of weak inorganic acids include substances like potassium and sodium borate, and $K_2HPO_4$. In the case of polyfunctional acids like $H_3PO_4$, the acids have to be neutralized to the conjugate bases of the appropriate strength. $KH_2PO_4$ is not a suitable cocatalyst, for instance. Conjugate bases of weak acids can be produced be reacting a weak organic acid with a base to form the conjugate base (and water). Acetic acid, for instance, reacts directly with potassium hydroxide to form the conjugate base potassium acetate. Weak acids include acetic, benzoic, formic, lauric, and other carboxylic acids and polycarboxylic acids; phenol, chlorophenols, and nitrophenol and various other substituted phenols; and various inorganic acids, such as boric acid, dipotassium phosphate, and sodium silicate. The conjugate bases of these weak acids act as cocatalysts with epoxy compounds to provide transesterification as a cure mechanism for coatings.

Referring next to the transesterification catalysts based on an inorganic salt of a halide, an azide, a cyanide, or a hydroxide, suitable inorganic salts are derived from inorganic cations other than onium salts such as sodium, potassium, lithium, calcium and iron combined with inorganic anions selected from halogens including chlorides, bromides, and iodides, as well as azides, cyanides, and hydroxides. The inorganic salts can be combined with catalytic epoxy resin to activate a transesterification cure in accordance with this invention.

The foregoing nucleophilic catalytic compounds are combined with a catalytic amount of epoxy resin compound hereinafter described to provide the transesterification catalyst combination in accordance with this invention.

Referring next to the epoxy resin used as a cocatalyst with the monovalent inorganic salts, catalytic epoxy resins can be a monomeric or polymeric epoxide selected from the group consisting of $C_{2-18}$ alkylene oxides, arylalkylene oxides, cycloaliphatic oxides, and a polymeric or oligomeric epoxide having at least one epoxide group per molecule. The epoxy compound cocatalyst can be an aliphatic, an aromatic or a glycidyl acrylic type epoxy compound. The most suitable catalytic epoxy resins comprise glycidyl ethers of bisphenol or glycidyl addition polymers. Glycidyl ethers of bisphenol include typically glycidyl ethers of polymers based on bisphenol A (or similar bisphenols) such as bisphenol A diglycidyl ether (Epon 828, Shell), and higher molecular weight versions, linear or branched, having one, two, or more glycidyl groups per molecule. Glycidyl addition polymers comprise acrylic polymers containing copolymerized ethylenically unsaturated monomers including glycidyl methacrylate or glycidyl acrylate monomers. Other epoxy resins containing monofunctional oxirane are useful including oleic acid oxide, t-butyl phenyl glycidyl ether and the like.

Examples of catalytic epoxy resins useful for the cure catalyst include $C_{2-18}$ alkylene oxides and oligomers and/or polymers having epoxide functionality including multiple epoxy functionality. Particularly suitable alkylene oxides include propylene oxide, 1,2-butylene oxide, 1,2-hexylene oxide, tert-butyl glycidyl ether, phenyl glycidyl ether, glycidyl acetate, and glycidyl benzoate. Useful multifunctional oxiranes include Bisphenol A diglycidyl ether, diglycidyl adipate, 1,4-diglycidyl butyl ether, Novalac resins and other commercial epoxy resins. Bisphenol A diglycidyl ether is a preferred epoxide. Such epoxy resins comprise a low molecular weight resin produced by bisphenols reacted with epichlorohydrin having a molecular weight between about 400 and 4000 as measured by GPC. Preferred epoxy resins comprise linear polymer chains of repeating units of diglycidyl compounds with various bisphenols such as bisphenol A or bisphenol-5. Also useful are acrylic polymers having epoxide functionality such as acrylic copolymers derived from glycidyl methacrylate. Oxirane compounds can include isobutylene oxide (2-methyl-1, 2-propene oxide), 2-methyl-1,2-hexene oxide, 2-phenyl-1, 2-propene oxide (alpha-methyl styrene oxide), 2-phenoxy methyl-1, 2-propene oxide, and the like. Other oxiranes include 2,3-dimethyl-2-butene oxide, 2-methyl-2-butene oxide, oleic acid oxide, and 1-phenyl propene oxide.

The catalyst combination can comprise on a weight basis between 0.1 and 20 of a nucleophile catalyst with 1 to 20 weight parts of catalytic epoxy resin per 100 weight parts of matrix thermosetting binder comprising the beta-hydroxy ester copolymer and the coreactive hydroxyl polymer. The catalyst combination is added to the coreactive matrix polymers at a preferred level between 2 and 40 weight parts catalyst combination per 100 weight parts coreactive matrix polymers.

In accordance with this invention, transesterification is achieved by crosslinking hydroxyl functional polymers with the beta-hydroxyl ester copolymer and crosslinking the respective binder components in the presence of catalytic amounts of a nucleophilic catalyst and epoxy resin compound. In practice, the nucleophilic catalyst reacts with the catalytic epoxy compound oxirane group to form the following complex:

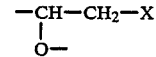

where X is the anion from an onium salt; or X is nitrogen, phosphorous, arsenic, antimony or bismuth of the Lewis bases or the like; or X is the conjugate base of a weak acid; or X is the anion of an organic salt of a halide, azide, cyanide, or hydroxide. The complex then reacts with the ester group of the beta-hydroxy ester crosslinker to cleave the ester group and form a catalytic species of a low molecular weight alkoxy radical cleaved from the ester crosslinker. Then, the cleaved alkoxy radical interreacts with the hydroxyl group on the hydroxyl polymer to form an activated alkoxy polymer, and a low molecular weight alcohol. The volatile alcohol (generally ethylene or propylene glycol) can easily leave the curing polymer film. Meanwhile, the polymeric alkoxy radical from the hydroxyl polymer activates a second ester group on a beta-hydroxy ester component whereupon the activated second ester group liberates a small molecular alkoxy species and an ester bond is formed. The cleaved alkoxy radical repeats the activation between a second hydroxyl group, and a third ester group which further promotes the crosslinking between the beta-hydroxy ester crosslinker and the hydroxyl polymers while regenerating alkoxy radicals and liberating more volatile alcohol molecules.

Cure conditions vary with the concentration of relative amounts of the catalyst combination as well as the type of alcohol which leaves during the transesterification reation. Lower boiling alcohols allow faster, lower temperature cures than higher boiling alcohols. Transesterification cures can be obtained at temperatures as low as 200° F. at 5 minutes although higher temperatures and longer cure times are required if the coating if formulated for longer shelf life beyond two weeks. Alternatively, milder curing conditions are possible if at least one of the two catalyst components is withheld from the coatings composition until soon before or during application.

The merits of using a beta-hydroxy ester addition copolymer adapted to be crosslinked with a hydroxyl functional polymer upon being activated by transesterification cure catalysts comprising a nucleophilic compound and catalytic epoxy compound are further illustrated in the following examples. In the following illustrative example, unless otherwise indicated, parts and percentages are by weight and temperature is given in degrees Centigrade. For evaluation purposes in the examples, coatings were applied at 1-2 mil thickness to phophate treated cold-rolled steel panels and baked for 20 minutes at 360° F. Film properties were evaluated using the following evaluation:

(1) marring after 100 MEK double rubs;
(2) pencil hardness;
(3) MEK double rubs (MEK DR) consisted of a cotton rag wrapped around the index finger, soaked with methylethyl ketone and then wiped with a 2-inch stroke across the coated surface. Up and back motions with moderate pressure are counted as one rub. The rag was resoaked with MEK after each 20 rubs. The number of rubs was recorded to the point where the coating is just removed, or after 100 rubs record percentage of mar if the coating has not been removed.
(4) Impact resistance to a falling ⅜ inch dart, values recorded are maximum impact values which gave no film cracking.

EXAMPLES

TABLE I

| Ex. | Acrylic | Polyester | % Polyester | Pencil Hardness | Impact Forw./Rev. |
|---|---|---|---|---|---|
| 1 | A | None | — | 3H | 30/10 |
| 2 | A | A | 16 | 4H | 160/160 |
| 3 | A | B | 13.6 | 4H | 160/160 |
| 4 | A | C | 6 | 4H | 160/160 |
| 5 | A | D | 15 | 4H | 160/160 |
| 6 | A | E | 15 | 4H | 160/160 |
| 7 | A | F | 15 | 4H | 160/160 |
| 8 | B | None | — | 3H | 20/10 |
| 9 | B | G | 15 | 3H | 160/160* |
| 10 | A | A | 30 | 2H | 160/160 |

*Film was hazy at bend, but no cracks or fractures.

Examples 1–7 had 11.5% Epon 828 (Shell epoxy, 200 eq. wt.) and 2.2% benzyltrimethyl ammonium acetate as the ENCAT cocatalyst. Paints were all whites with $TiO_2$, P/B=0.85/1.
Examples 8–9 had 10% PD 7610, a glycidyl functional acrylic as the epoxy source, and 3% benzyltrimethyl ammonium acetate. No $TiO_2$.
Example 10 had 11.5% Epon 828 (Shell epoxy, 200 eq. wt.) and 30% dodecyl trimethyl ammonium acetate as the ENCAT cocatalyst. Paints were all whites with $TiO_2$ P/B=0.85/1.
All films were baked at 300° F. for 20 minutes. All had 100 MEK rub resistance with some slight marring.
High temperature bake (375° F. for 20 minutes)

|  | MEK Rubs | Impact Resistance |
|---|---|---|
| Example 2 | <10 | — |
| Example 10 | >100 | 160/160 |

Acrylic A: Prepare from the following:

|  |  | Grams |
|---|---|---|
| a. | Xylene | 1098 |
| b. | Styrene | 866 |
|  | ethyl acrylate | 758 |
|  | hydroxy propyl methacrylate | 544 |
|  | methacrylic acid | 28 |
| c. | t-butyl perbenzoate | 87 |
| d. | xylene | 222 |

Place (a) in a 5 l. vessel and heat with nitrogen purge. Combine 440 g. of (b) with (c) and add to vessel. Hold 15 minutes, then pump remainder of (b) in over 3 hours. Heat to 145° C., hold 2 hours, cool and add (d).

Acrylic B
Prepare an acrylic from the following:

|  |  | Grams |
|---|---|---|
| a. | methylamyl ketone | 670 |
| b. | t-butyl perbenzoate | 40 |
|  | methyl methacrylate | 1179 |
|  | styrene | 300 |
|  | 2-hydroxyethyl acrylate | 414 |
|  | butyl acrylate | 170 |

1. Heat (a) to 140° C. and hold under $N_2$ blanket.
2. Pump in (b) mix over 3 hours while holding 140° C. with stirring. Hold 15 minutes. Add 2 g t-butyl perbenzoate. Hold 30 minutes. at 140° C.
3. Strip off solvent and residual monomer under vacuum. Total distillate 703 g. (170° C. maximum temperature).
4. Cool.
5. Prepare solution for testing by blending 50 g methylethyl ketone and 50 g. acrylic.

Polyester A: Prepare a polyester from the following:

|  | Grams |
|---|---|
| Adipic acid | 146 |
| Isophthalic acid | 166 |
| neopentyl glycol | 312 |
| butyl stanoic acid | 0.2 |

Cook at 150 to 220° C. in a flask equipped with a nitrogen blanket, a stirrer, a thermometer and a glass bead packed column. Keep the packed column head temperature at a maximum of 100° C. Cook to an acid number of less than 10. Cool.

Polyester B: (As in A but use:)

|  | Grams |
|---|---|
| 1,6-hexane diol | 1463 |
| neopentyl glycol | 1933 |
| isophthalic acid | 4108 |
| trimethylol ethane | 766 |

Polyester C: (As in A but use:)

|  | Grams |
|---|---|
| adipic acid | 146 |
| isophthalic acid | 664.8 |
| trimethylol propane | 1342 |

Polyester D: (As in A but use:)

|  | Grams |
|---|---|
| adipic acid | 877 |
| isophthalic acid | 498 |
| butylstanoic acid | 0.5 |
| trimethylol propane | 810 |
| propylene glycol | 687 |

Polyester E: (As in A but use:)

|  | Grams |
|---|---|
| azelaic acid | 188 |
| isophthalic acid | 166 |
| neopentyl glycol | 208 |
| propylene glycol | 76 |
| butyl stanoic acid | 0.2 |

Polyester F: (As in A but use:)

|  | Grams |
|---|---|
| azelaic acid | 753 |
| isophthalic | 831 |
| butylstanoic acid | 0.5 |
| trimethylol propane | 805 |
| propylene glycol | 684 |

Polyester G: (As in A but use:)

|  | Grams |
|---|---|
| dodecanedioic acid | 460.6 |
| 1,6-hexane diol | 295 |
| butyl stanoic acid | 0.3 |

The foregoing examples illustrate the merits of thermosetting paint compositions based on a thermosetting transesterification cure of a hydroxyl polyester polymer and a beta-hydroxy ester copolymer, but are not intended to be limiting except by the appended claims.

We claim:

1. A thermosetting paint composition containing a thermosetting polymeric binder, the binder comprising on a weight basis:
   between 2% and 50% of a hydroxyl functional polyester polymer having a hydroxyl number between about 5 and 200 and a number average molecular weight between about 300 and 30,000 as measured by GPC;
   between 50% and 98% of a beta-hydroxy ester copolymer of copolymerized ethylenically unsaturated monomers comprising between 1% and 50% beta-hydroxyl ester alkyl acrylate or methacrylate monomer, between 0% and 90% acrylic monomer other than said beta-hydroxyl ester monomer, with the balance being other ethylenic monomer; and
   where said binder contains an activating transesterification catalyst combination for activating crosslinking between the polyester polymer and the beta-hydroxy ester acrylic copolymer, the catalyst combination comprising between 1 and 20 weight parts catalytic epoxy compound and between 0.1 and 10 weight parts nucleophile compound per 100 weight parts of said binder, said nucleophilic compound selected from (a) an onium salt, (b) a Lewis base, (c) a conjugate base of a weak acid having a pka between 2.5 and 14, or (d) an inorganic salt of a halide, an azide, a cyanide or a hydroxide.

2. The composition in claim 1 where the beta-hydroxy ester copolymer is an acrylic copolymer containing between 1% and 90% copolymerized acrylic monomer.

3. The composition in claim 1 containing between 50% and 30% by weight said hydroxyl functional polyester polymer.

4. The composition in claim 1 where the beta hydroxy ester monomer is produced by coreacting an acrylic or methacrylic acid with ethylene oxide or propylene oxide to produce a beta hydroxy monomer having an ethylenically unsaturated double bond.

5. The composition in claim 1 where the beta hydroxy ester monomer is 2-hydroxy ethyl acrylate or methacrylate.

6. The composition in claim 1 where the beta hydroxy ester monomer is 2-hydroxy propyl acrylate or methacrylate.

7. The composition in claim 1 where the beta hydroxy ester copolymer is an acrylic copolymer comprising copolymerized monomers of 10% to 30% beta-hydroxy ester monomer, 70% to 90% acrylic monomer, with the balance being other ethylenic monomer.

* * * * *